(12) United States Patent
Beasley

(10) Patent No.: US 9,333,924 B2
(45) Date of Patent: May 10, 2016

(54) VEHICLE STORAGE DEVICE

(71) Applicant: Glenn Beasley, Tignall, GA (US)

(72) Inventor: Glenn Beasley, Tignall, GA (US)

( * ) Notice: Subject to any disclaimer, the term of this patent is extended or adjusted under 35 U.S.C. 154(b) by 0 days.

(21) Appl. No.: 14/848,869

(22) Filed: Sep. 9, 2015

(65) Prior Publication Data

US 2015/0375690 A1    Dec. 31, 2015

Related U.S. Application Data

(60) Provisional application No. 62/050,417, filed on Sep. 15, 2014.

(51) Int. Cl.
 *B60R 11/00*    (2006.01)

(52) U.S. Cl.
 CPC ........... *B60R 11/00* (2013.01); *B60R 2011/004* (2013.01); *B60R 2011/0045* (2013.01)

(58) Field of Classification Search
 CPC ............ B60R 2011/0045; B60R 11/00; B60R 2011/004
 USPC ....................................................... 296/37.6
 See application file for complete search history.

(56) References Cited

U.S. PATENT DOCUMENTS

| | | | |
|---|---|---|---|
| 4,136,904 A | 1/1979 | Lauderdale | |
| 4,660,880 A | 4/1987 | Bensch | |
| 4,789,195 A | 12/1988 | Fletcher | |
| 6,824,184 B2 | 11/2004 | Leitner et al. | |
| 2005/0052045 A1 | 3/2005 | Juzwiak | |

*Primary Examiner* — Pinel Romain
(74) *Attorney, Agent, or Firm* — Global Intellectual Property Agency LLC

(57) ABSTRACT

A vehicle storage device for storing and organizing documents, rolled blueprints, and other objects needed when traveling to a construction site. The vehicle storage device includes a main compartment having an interior volume and an open front wall, wherein the main compartment can be integrated into the body of a vehicle. The vehicle storage device further includes one or more secondary compartments disposed within the main compartment, wherein at least one of the secondary compartments is movable between a stored configuration and an extended configuration so as to allow a user convenient access to objects stored therein. A door is secured to the main compartment and removably covers the open front wall thereof so as to remain flush with the exterior of the vehicle. In this way, the exterior of the vehicle has a continuous surface and the aerodynamics thereof are not impacted by the presence of the device.

12 Claims, 3 Drawing Sheets

VEHICLE STORAGE DEVICE

CROSS REFERENCE TO RELATED APPLICATION

This application claims the benefit of U.S. Provisional Application No. 62/050,047 filed on Sep. 15, 2014. The above identified patent application is herein incorporated by reference in its entirety to provide continuity of disclosure.

BACKGROUND OF THE INVENTION

Field of the Invention

The present invention relates to storage devices. More specifically, the present invention provides a vehicle storage device comprising a main compartment having one or more secondary compartments disposed within the main compartment, wherein at least one of the secondary compartments is movable between a stored configuration and an extended configuration so as to allow a user convenient access to objects stored therein.

Many contractors spend a majority of their time in vehicles traveling to and from various construction sites. These individuals have extensive amounts of documents, blueprints, keys, and safety equipment for each of these worksites. Unfortunately, vehicles used to travel to the worksites, such as pickup trucks, do not have adequate storage for such objects. Therefore, documents and other supplies, such as hardhats, site keys, and safety vests, become scattered in the cabin of the truck, thereby creating a disorganized and unprofessional appearance. These conditions cause a contractor to waste time and energy searching for a specific document or other needed object.

Conventional storage devices that may be placed in a vehicle occupy a significant amount of space that is needed to transport other equipment, such as larger construction equipment. Furthermore, a truck bed is inadequate to store blueprints and other important documents because they can easily fly out of a moving truck. Therefore, there exists a need for a convenient and professional storage compartment configured to be positioned within the body of a vehicle.

Devices have been disclosed in the prior art that relate to storage devices. These include devices that have been patented and published in patent application publications. These devices generally relate to storage devices for vehicles having a door allowing access to one or more sections within the storage device, such as U.S. Pat. No. 4,789,195, U.S. Pat. No. 6,824,184, U.S. Pat. No. 4,660,880, U.S. Pat. No. 4,136,904, and U.S. Published Patent Application Number 2005/0052045.

These prior art devices have several known drawbacks. The storage devices in the prior art are adapted to rest on a vehicle, such as in a truck bed. However, these devices fail to provide interior compartments that are pivotally and slidably secured thereto. Thus, items stored within the compartment cannot be conveniently accessed. Furthermore, the devices in the prior art fail to provide storage compartments having one or more slots or openings configured to receive documents and rolled blueprints. The present invention provides a vehicle storage device having one or more secondary compartments that are pivotally and slidably secured within a main compartment, wherein objects stored therein are secure when the vehicle is in motion and easily accessible when desired.

In light of the devices disclosed in the prior art, it is submitted that the present invention substantially diverges in design elements from the prior art and consequently it is clear that there is a need in the art for an improvement to existing vehicle storage devices. In this regard the instant invention substantially fulfills these needs.

SUMMARY OF THE INVENTION

In view of the foregoing disadvantages inherent in the known types of vehicle storage devices now present in the prior art, the present invention provides a new vehicle storage device wherein the same can be utilized for providing convenience for storing and organizing documents, rolled blueprints, and other objects needed when traveling to a construction site.

It is therefore an object of the present invention to provide a new and improved vehicle storage device that has all of the advantages of the prior art and none of the disadvantages.

It is another object of the present invention to provide a vehicle storage device comprising a main compartment having an interior volume and an open front wall, wherein the main compartment is configured to be integrated into the body of a vehicle.

Another object of the present invention is to provide a vehicle storage device comprising one or more secondary compartments disposed within the interior volume of the main compartment.

Yet another object of the present invention is to provide a vehicle storage device wherein at least one of the secondary compartments is movable between a stored configuration, such that the secondary compartment is disposed within the main compartment, and an extended configuration, such that the secondary compartment extends outward from the main compartment.

Yet another object of the present invention is to provide a vehicle storage device comprising one or more filing compartments having one or more slots disposed on a sidewall thereof, wherein each slot is configured to receive one or more documents therein.

Another object of the present invention is to provide a vehicle storage device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
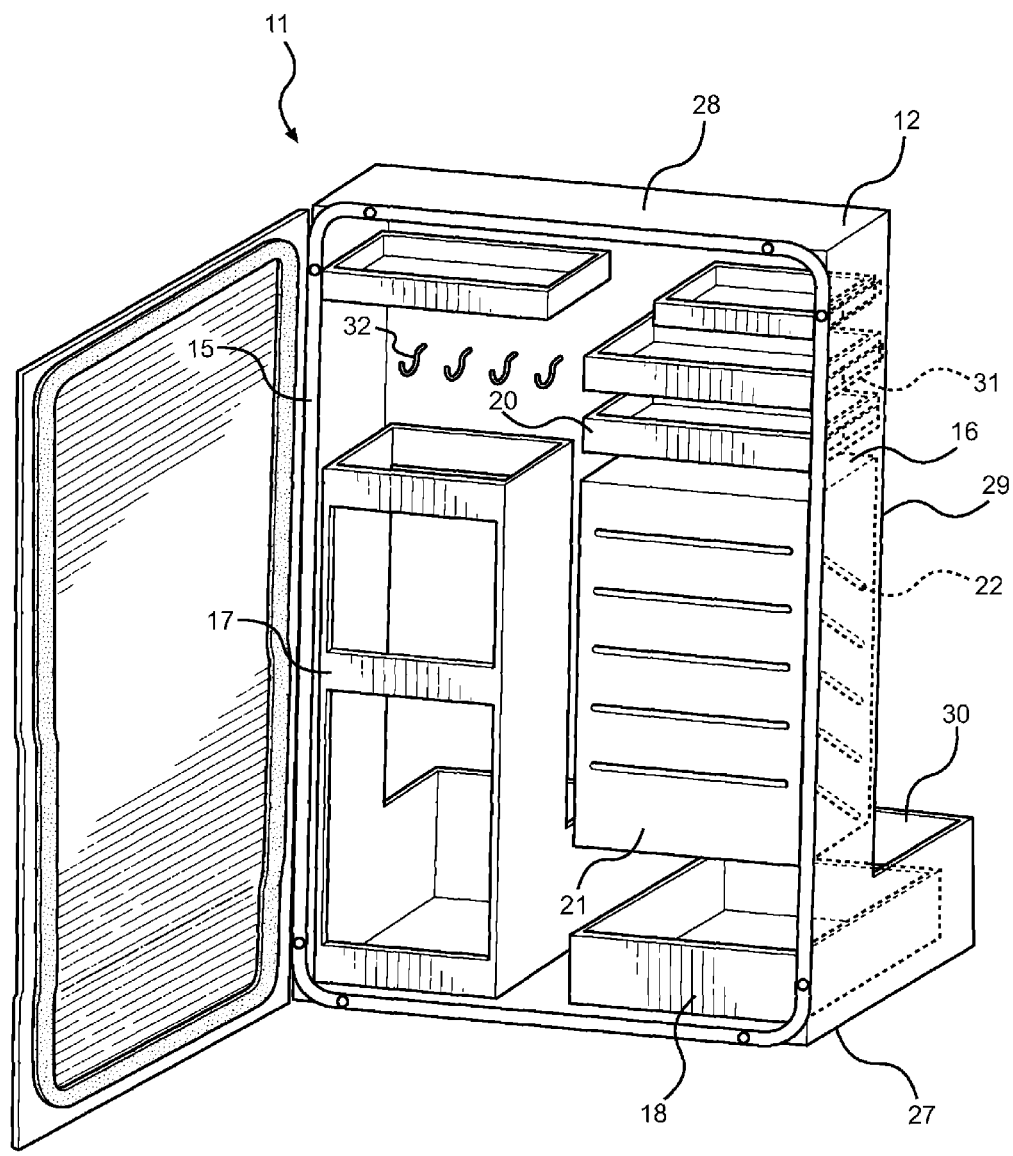
FIG. 1 shows a perspective view of the vehicle storage device wherein the door is open.

Reference is made herein to the attached drawings. Like reference numerals are used throughout the drawings to depict like or similar elements of the vehicle storage device.

For the purposes of presenting a brief and clear description of the present invention, the preferred embodiment will be discussed as used for storing and organizing documents, rolled blueprints, and other objects needed when traveling to a construction site. The figures are intended for representative purposes only and should not be considered to be limiting in any respect.

Referring now to FIG. 1, there is shown a perspective view of the vehicle storage device wherein the door is open. The vehicle storage device 11 comprises a main compartment 12 having a lower wall 27, an upper wall 28, one or more sidewalls 16, a rear wall 29, and an open front wall 15. The main compartment 12 is configured to be integrated into the body of a vehicle. In the illustrated embodiment, the main compartment 12 is substantially L-shaped in configuration, wherein a rear wall 29 comprises a lower section 30 extending from the lower end thereof so as to allow additional storage space near the lower wall 27 of the vehicle storage device 11. However, in other embodiments, the main compartment 12 can be any suitable configuration adapted to be disposed on the body of a vehicle, such as rectangular.

The open front wall 15 of the main compartment 12 is removably covered by a door 13, wherein the door 13 is pivotally secured to the main compartment 12. Preferably, the vehicle storage device 11 comprises a seal 14 disposed around the periphery of the interior of the door 13, such that the seal 14 aligns with one or more edges of the open front wall 15 of the main compartment 12 so as to seal the interior volume thereof. Any suitable seal 14 may be used, such as a rubber gasket. The seal 14 prevents rain and other outside elements from entering the main compartment 12 damaging documents and other objects therein.

The main compartment 12 can be integrated into a vehicle during manufacturing. Alternatively, the main compartment 12 can be retrofitted into an existing vehicle by removing a body panel and securing the main compartment 12 within the body panel such that the door 13 of the vehicle storage device 11 is flush with the exterior of the vehicle. The door 13 is flush with the exterior of the vehicle so that the exterior has a continuous surface and the aerodynamics of the vehicle are not impacted by the presence of the device 11. The main compartment 12 can be secured to the vehicle by any suitable fastener, such as screws.

The vehicle storage device 11 comprises one or more secondary compartments 20 disposed within the main compartment 12. The secondary compartments 20 comprise a base, one or more sidewalls, and an open upper end, defining an interior volume. In the illustrated embodiment, the secondary compartments 20 comprise a substantially rectangular shape. Preferably, the secondary compartments 20 comprise various sizes that are configured to organize and store various objects. In the illustrated compartment, a first secondary compartment 17 comprises an elongated rectangular shape configured to store rolled blueprints. A second secondary compartment 18 comprises a tray-like rectangular shape configured to store objects needed when traveling to various construction sites, such as hard hats, safety vests, writing utensils, business cards, and the like.

In the illustrated embodiment, the vehicle storage device 11 further comprises one or more filing compartments 21 configured to hold one or more documents or folders therein. Each filing compartment 21 comprises a rectangular shape having a base, one or more sidewalls, and an upper end. The filing compartment 21 further comprises one or more elongated slots 22 disposed on a sidewall thereof. Each slot 22 is disposed at a downward angle so as to receive and securely support a document therein. Thus, when the vehicle is in motion, the documents will remain within the elongated slots 22. Preferably, one or more fasteners 32 are disposed on the interior of the main compartment 12 and configured to suspend objects therefrom, such as keys. Any suitable fastener 32 may be used, such as hooks or D-rings.

Figure 2:
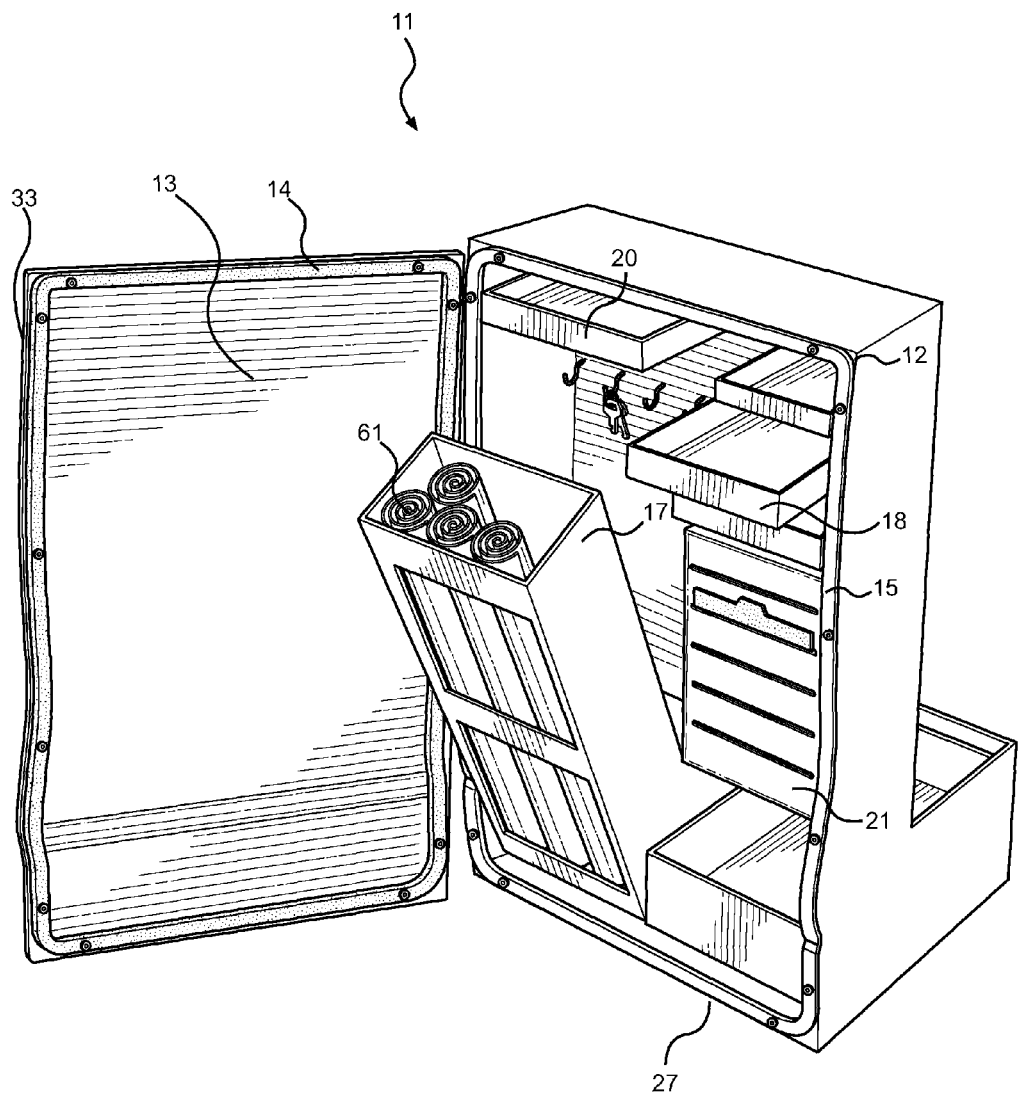
FIG. 2 shows a perspective view of the vehicle storage device wherein one or more secondary compartments are in an extended configuration.

Referring now to FIG. 2, there is shown a perspective view of the vehicle storage device wherein one or more secondary compartments are in an extended configuration. Preferably, at least one of the secondary compartments 20 is movable between a stored configuration and an extended configuration so as to allow a user to conveniently access objects stored therein. In the stored configuration, a secondary compartment 20 is disposed within the main compartment 12 of the vehicle storage device 11 so as to allow the door 13 to cover the front wall 15 without having any obstacle protruding therethrough. In the extended configuration, a secondary compartment 20 extends outward beyond the front wall 15 of the main compartment 12 so as to allow a user convenient access to the interior thereof.

In some embodiments, the first secondary compartment 17 is pivotally secured to the lower wall 27 of the main compartment 12. Thus, in the extended configuration, the open upper end of the first secondary compartment 17 tilts toward the open front wall 15 of the main compartment 12. Thus, a user can remove a rolled blueprint 61 from the compartment 17 without other secondary compartments 20 positioned thereabove obstructing access thereto.

In other embodiments, the second secondary compartments 18 are slidably secured to the interior of the main compartment 12 via a sliding mechanism (referenced in FIG. 1, 31). In the illustrated embodiment, the sliding mechanism comprises a pair of tracks, wherein a first track is disposed on the interior walls of the main compartment 12 and a second track is disposed on the adjoining wall of the secondary compartment 18, such that the tracks are slidably secured to one another allowing the secondary compartment 18 to slide from a stored configuration to an extended configuration. In alternate embodiments, the sliding mechanism can be any suitable configuration as long as the second secondary compartment 18 is slidably secured to the main compartment 12.

The door 13 is movable between an open configuration and a closed configuration. In an open configuration, an edge 33 of the door 13 is pivoted away from the main compartment 12 so as to allow a user to access the interior thereof. The dimension of the door 13 comprises substantially the same dimension as the open front wall 15 so as to allow the interior of the main compartment 12 to remain concealed when the door 13 is in a closed configuration.

Figure 3:
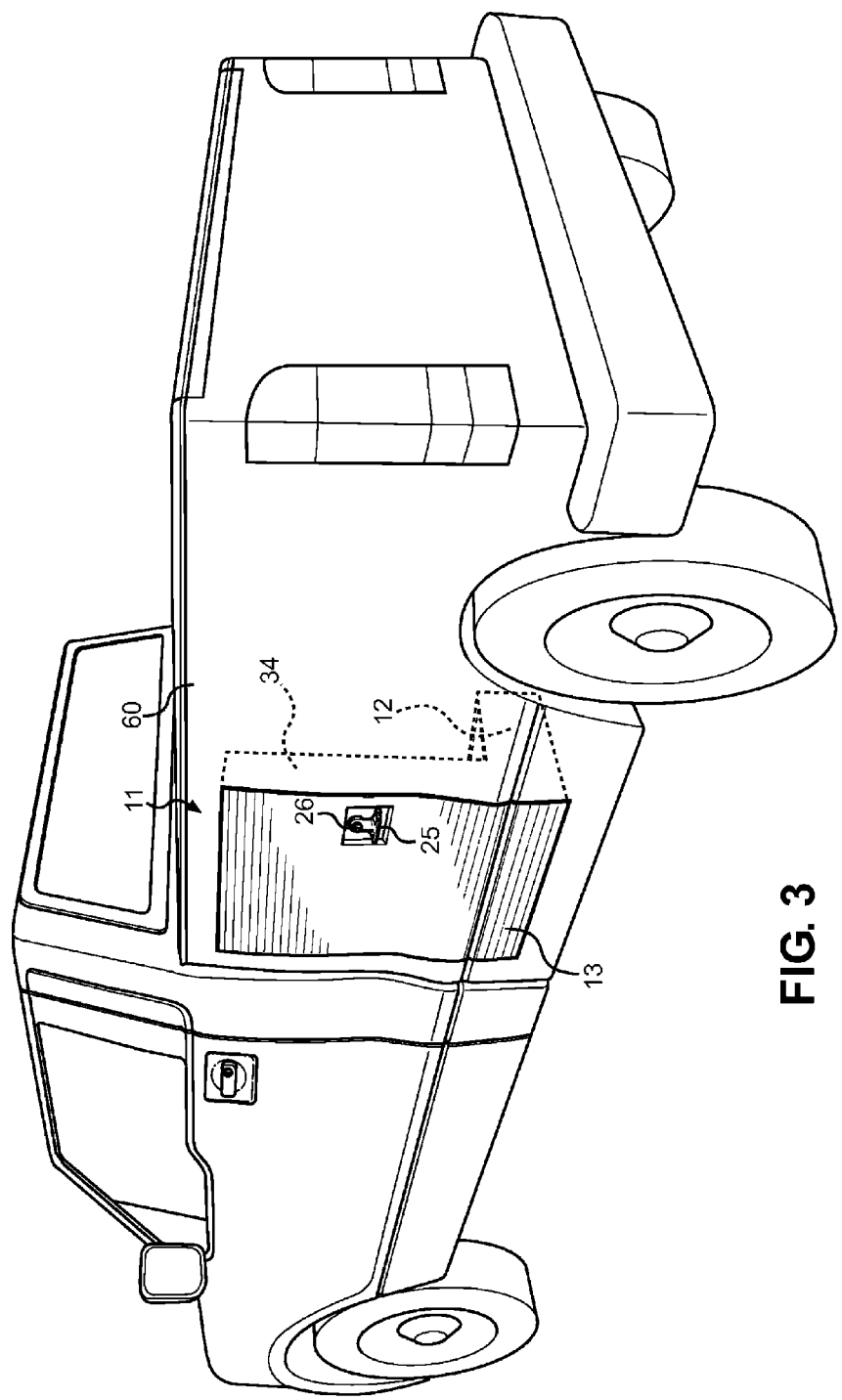
FIG. 3 shows a perspective view of the vehicle storage wherein the door is closed.

Referring now to FIG. 3, there is shown a perspective view of the vehicle storage wherein the door is closed. In a closed configuration the door 13 lies flush against the edges of the front wall. The shape of the exterior of the door 13 corresponds to the shape of the exterior of the vehicle 60 in which the device 11 is positioned. A handle 25 is disposed on the exterior of the door 13 so as to allow the door 13 to be opened from the closed configuration. Preferably, the handle 25 comprises a T-shape and a lock 26 thereon. The T-shaped handle 25 allows a user to easily grip and pull the handle 25 so as to open the door 13. The lock 26 allows a user to control access to the interior of the main compartment 12, thereby keeping objects securely stored therein.

In the illustrated embodiment, the vehicle storage device 11 is positioned on the exterior of the truck bed of the vehicle 60. However, in alternate embodiments, the vehicle storage device 11 can be positioned in any suitable location on the body of a vehicle 60. In some embodiments, the vehicle storage device 11 comprises a vehicle 60 having a recessed area 34 disposed within the body thereof. The recessed area 34 comprises a shape corresponding to the shape of the main compartment 12 and an opening so as to receive the main compartment 12 therein. The main compartment 12 is disposed within the recessed area 34 such that the door 13 remains flush with the opening of the recessed area 34.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle storage device, comprising:
   a main compartment having an interior volume and an open front wall, wherein said main compartment is configured to be integrated into a body of a vehicle;
   one or more secondary compartments disposed within said interior volume of said main compartment, wherein each of said one or more secondary compartments comprise a base, one or more sidewalls, and an open upper end;
   at least one of said one or more secondary compartments are movable between a stored configuration, wherein a secondary compartment is disposed within said main compartment, and an extended configuration, wherein said secondary compartment extends outward from said open front wall of said main compartment;
   a door pivotally secured to said main compartment and configured to removably cover said open front wall.

2. The vehicle storage device of claim 1, further comprising a seal disposed around a periphery of said door, such that said seal aligns with one or more edges of said open front wall so as to seal said interior volume of said main compartment.

3. The vehicle storage device of claim 1, wherein said door comprises a T-shaped handle thereon.

4. The vehicle storage device of claim 1, wherein said door comprises a lock thereon.

5. The vehicle storage device of claim 1, wherein at least one of said one or more secondary compartments is pivotally secured to said main compartment so as to allow said open upper end of said secondary compartment to tilt outward beyond said open front wall of said main compartment.

6. The vehicle storage device of claim 1, wherein at least one of said one or more secondary compartments is slidably secured to said main compartment so as to allow said open upper end of said secondary compartment to slide outward beyond said open front wall of said main compartment.

7. The vehicle storage device of claim 1, further comprising one or more fasteners configured to suspend one or more objects therefrom.

8. The vehicle storage device of claim 7, wherein said one or more fasteners are hooks.

9. The vehicle storage device of claim 1, further comprising one or more filing compartments having a base, one or more sidewalls, an upper end, and one or more elongated slots disposed on said one or more sidewalls, wherein said one or more elongated slots are configured to receive one or more folders therein.

10. The vehicle storage device of claim 9, wherein each of said one or more elongated slots are disposed at a downward angle.

11. The vehicle storage device of claim 1, further comprising a vehicle having a recessed area disposed on said body thereof, wherein said recessed area is configured to receive said main compartment.

12. The vehicle storage device of claim 1, wherein said main compartment comprises an L-shaped configuration.

\* \* \* \* \*